Jan. 11, 1944.   J. C. TROTTER   2,339,227

GUN

Filed July 8, 1941   2 Sheets-Sheet 2

INVENTOR
JOHN C. TROTTER
BY
Bean, Brooks, Buckley & Bean.
ATTORNEYS

Patented Jan. 11, 1944

2,339,227

UNITED STATES PATENT OFFICE 2,339,227

GUN

John C. Trotter, Williamsville, N. Y., assignor to Bell Aircraft Corporation, Buffalo, N. Y.

Application July 8, 1941, Serial No. 401,425

10 Claims. (Cl. 89—42)

This invention relates to automatic guns of the rapid fire type, and more particularly to recoil shock absorbing and counter recoil mechanisms for use in conjunction with the mounting of such guns upon airplanes or the like. One of the objects of the invention is to provide, in conjunction with a rapid fire gun, an improved form of recoil shock absorbing mechanism. Another object of the invention is to provide an improved form of rapid fire gun of heavy caliber type for mounting upon airplanes or the like. Another object is to provide an improved arrangement for mounting automatic guns upon airplane wings or other airfoil type structures. Other objects and advantages of the invention will appear in the specification hereinafter.

Figure 1:
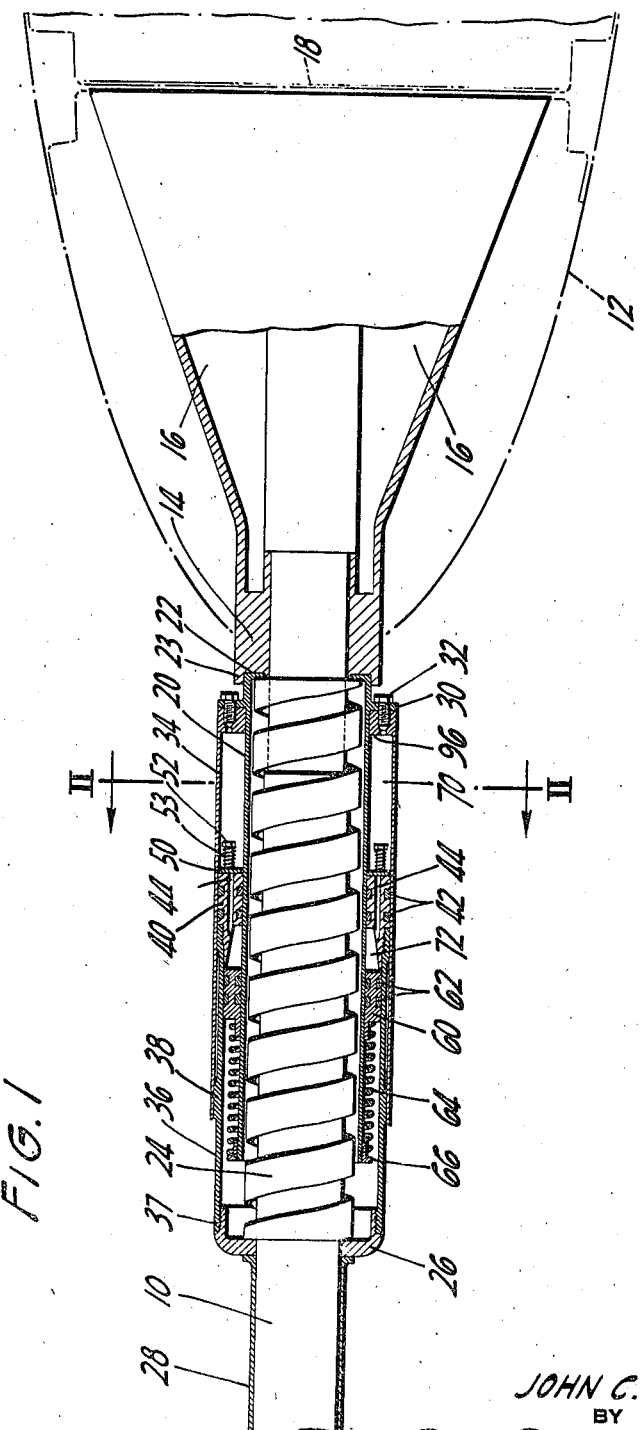
Fig. 1 is a fragmentary view of a rapid fire gun of the aerial cannon type, showing a recoil shock absorbing mechanism and gun mount structure of the invention in association therewith, in section.

The drawings illustrate the invention in conjunction with a gun having a barrel 10 which is shown mounted upon an airplane wing, indicated at 12, so as to project through the nose piece of the leading edge portion of the wing for firing in the direction of airplane flight. It will be understood that the barrel 10 comprises a portion of an aerial cannon or machine gun of the type wherein the gun barrel is arranged to reciprocate longitudinally in connection with recoil and counter recoil actions thereof. A bracket 14 is provided to encompass the gun barrel 10 in the region of the wing leading edge, and the bracket 14 is formed with diverging leg portions 16 for rigid mounting upon the wing spar 18, or any other suitable structural portion of the wing member. Thus, the gun barrel 10 is rigidly supported upon the wing structure by means of a bracket disposed within the contour of the wing covering. However, it will be understood that the bracket 14 may comprise a portion of any other suitable form of gun supporting structure, such as a hollow propeller shaft through which the gun is arranged to fire, or the like.

A recoil mechanism housing 20 of generally tubular form is arranged concentrically of the gun barrel 10 ahead of the bracket 14 so as to seat at its inner end portion 22 firmly against the bracket 14. A flange portion 23 of the bracket 14 extends over the housing 20 to maintain the latter against radial displacement from gun barrel concentric position. A gun recoil absorbing spring 24 is slidably disposed upon the barrel 10 so as to bear at one of its ends against the seat portion 22 of the housing 20. A collar 26 is carried by the gun barrel adjacent the outer end of the spring 24, and a cuff 28 is detachably fixed to the barrel 10 beyond the collar 26 so as to bear against the latter and to maintain the latter against movement relative to the gun barrel 10 under the action of recoil forces of the gun. Thus, upon firing of the gun, the barrel 10 is arranged to reciprocate longitudinally relative to the bracket 14; the recoil forces of the gun firing operation causing the collar 26 to move against the action of the spring 24 to compress the latter, whereupon the spring absorbs the recoil forces and is charged for subsequent expansion to return the gun barrel 10 to "battery" position.

The housing 20 is provided with an outwardly extending annular flange portion 30 to which is fixed by means of connection devices 32 a generally cylindrical shell or sleeve 34 arranged to extend forwardly and concentrically of the housing 20, and in spaced relation therefrom to provide a fluid receiving case. A sleeve or force member 36 of tubular form is screwthreaded into attachment with the collar 26, at 37, so as to be carried by the collar and to extend rearwardly into telescopic relation with respect to the housing 20 and the shell 34; the shell 34 and the sleeve 36 being so dimensioned that the sleeve 36 slidably fits against the inner surface of the shell 34. A raised annular portion 38 extending from the sleeve 36 into sliding connection with the shell 34 tends to reduce the frictional resistance to relative sliding movement therebetween. At its inner end the sleeve 36 carries an annular piston 40 which extends between the shell 34 and the housing 20 and is fitted with piston rings 42 at its inner and outer faces to provide a substantially oil-tight sealing between the shell and the housing.

Figure 2:
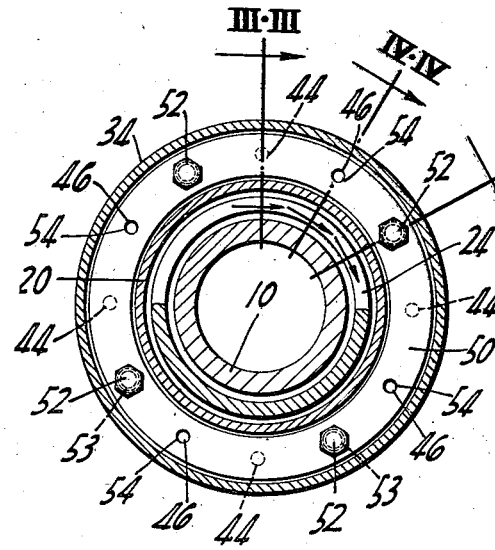
Fig. 2 is a section, on an enlarged scale, taken substantially along line II—II of Fig. 1.
Figure 3:
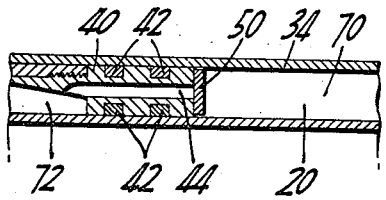
Fig. 3 is a fragmentary section taken along line III—III of Fig. 2.
Figure 4:
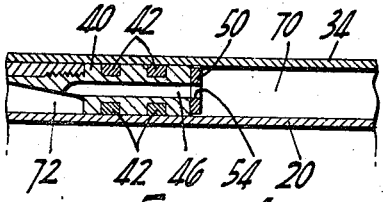
Fig. 4 is a fragmentary section taken along line IV—IV of Fig. 2.
Figure 5:
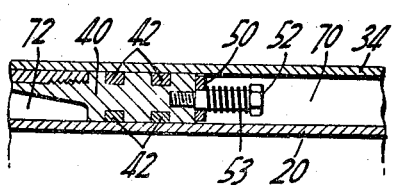
Fig. 5 is a fragmentary section taken along line V—V of Fig. 2.

The piston 40 is provided with a plurality of spaced fluid passageways 44 (Figs. 1, 2, 3) and a series of alternately disposed spaced passageways 46 extending longitudinally therethrough. An annular valve plate 50 is arranged to lie against the inner face of the piston 40, and is carried thereon by means of a series of spaced screws 52 carrying compression springs 53 which resiliently bear against the valve ring 50 so as to normally maintain it in seated relation against the piston 40. The valve ring 50 is apertured as indicated at 54 (Figs. 2 and 4) so as to register only with the passageways 46 through the piston 40. A gland 60 is slidably mounted between the housing 20 and the sleeve 36, and is provided with sealing rings 62 so as to be substantially fluid-tight yet longitudinally slidable between the sleeve and housing members. The gland 60 is backed up by means of a coil spring 64 which is arranged to seat at its outer end against a flanged ring 66 which is fixed to the housing 20.

Thus, it will be seen that the elements of the mechanism provide an annular fluid chamber 70 between the piston 40 and the bracket end of the unit, and a fluid chamber 72 between the piston 40 and the gland 60, which upon assembly of the mechanism are filled with oil or other suitable fluid substance. Upon firing of a cartridge in the gun the barrel 10 is driven rearwardly under the impact of the recoil force so as to slide within the bracket 14, thus compressing the recoil absorbing spring 24. The piston 40 is simultaneously driven rearwardly toward the bracket 14, and thus some of the oil within the chamber 70 is driven through the registering orifices 54—46 of the valve and piston members 50—40, and into the chamber 72. However, inasmuch as the cross sectional area of the chamber 72 is substantially less than the cross sectional area of the chamber 70, the fluid displaced from the chamber 70 exerts a forwardly directed pressure force against the gland 60, so as to extend the longitudinal extent of the chamber 72. Under this oil pressure force the gland 60 moves forwardly against the action of the spring 64, and it will be understood that the recoil shock absorbing action of the main spring 24 will be augmented and modified by the shock absorbing and movement damping action of the fluid within the chambers 70—72, as controlled by the dimensioning and arrangement of the fluid passage orifices and the action of the spring 64.

Upon exhaustion of the recoil force of the gun barrel 10 the springs 24 and 64 act to return the gun barrel to "battery" position. The movement of the collar 26 in return direction draws the piston 40 to return to the position of Fig. 1, and to accommodate this movement of the piston some of the fluid within the chamber 72 moves through the permanently open passageways 46—54 into the chamber 70. However, upon movement of the piston 40 to the left as viewed in Fig. 1, the valve plate 50 is adapted to move away from its normal seated position against the action of the springs 53, whereby the passageways 44 are uncovered and fluid is permitted to pass therethrough also to supplement the displacement of fluid through the passageways 46 of the piston. It will be understood that the return movement of fluid from the chamber 72 to the chamber 70 will be further assisted and accommodated by return movement of the gland 60 to the position of Fig. 1, in response to the action of the spring 64, and that the return movement of the gun barrel in connection with the counter-recoil stroke thereof will be limited by abutting action of the piston 40 and gland 60.

Thus, a structurally simple combination spring and fluid recoil force absorbing and counter recoil and recoil movement damping mechanism is provided, which is adapted to absorb the recoil forces of the gun and to return the barrel to "battery" position between each shot and to damp the movement of the gun barrel, in an improved manner. It will be appreciated that a particular feature and advantage of the invention resides in the fact that the recoil control and counter recoil movement mechanism of the invention is of such form as to nest compactly about the gun barrel unit without substantially increasing the bulk of the gun unit; and that the formation and arrangement of the operative elements of the mechanism are such that the device is located entirely outside of the supporting wing contour and is thereby accessible in an improved manner for repair and servicing operations. It will also be understood that the recoil absorbing and damping mechanism may be readily disassembled for servicing operations thereon by simply detaching the cuff 28, whereupon all of the remaining elements of the mechanism will be freed to slide along the gun barrel into completely disassembled positions.

Figure 6:
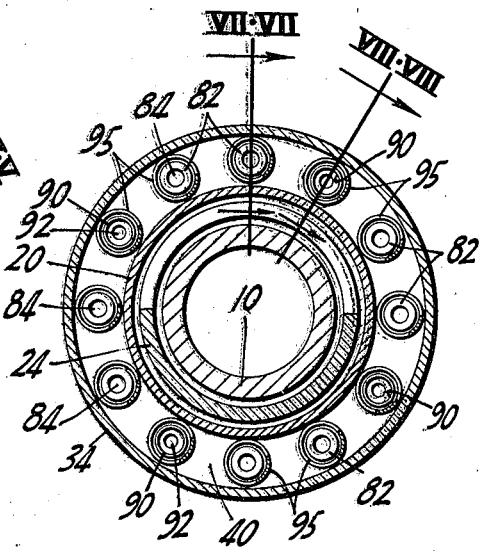
Fig. 6 is a view corresponding to Fig. 2 showing another form of recoil damping mechanism of the invention.
Figure 7:
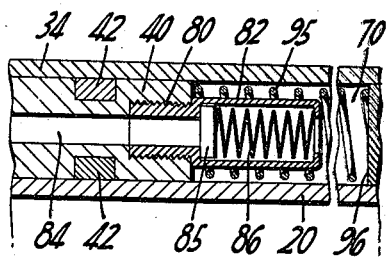
Fig. 7 is a fragmentary section taken along line VII—VII of Fig. 6.
Figure 8:
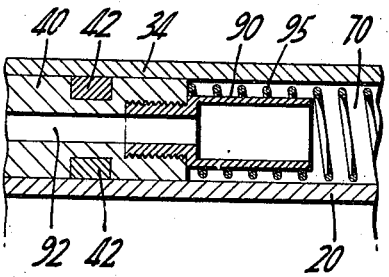
Fig. 8 is a fragmentary section taken along line VIII—VIII of Fig. 6.

Figs. 6, 7, and 8 illustrate details of another form of the invention wherein the piston valve mechanism comprises a series of valve units illustrated in section by Fig. 7. In this instance the piston 40 is bored and tapped as indicated at 80 for screwthreaded reception of a series of spaced open ended valve spools 82 which are centrally bored to register with passageways 84 through the piston. Each spool 82 carries a valve disc 85 which is of lesser diameter than the bore of the spool and arranged to seat against the inner end of the bored portion of the corresponding spool and to be resiliently pressed thereagainst by means of a compression spring 86. Thus, during recoil strokes of the piston 40 the valves 85 remain seated, but during counter recoil strokes of the piston the valves 85 open to permit movement of fluid from the chamber 72 around the valves 85 and through the spools 82 into the chamber 70. Another series of spools 90 of permanently open form (Figs. 6 and 8) are similarly mounted upon the piston 40 in registry with fluid passageways 92 through the piston, whereby provision is made for displacement of fluid from the chamber 70 into the chamber 72 during recoil movement of the gun barrel 10 relative to the bracket 14. The spools 82—90 provide convenient mounting means for fixing end portions of compression coil springs 95 within the fluid chamber 70 so that the springs 95 extend in parallel relation longitudinally of the chamber 70 about the gun barrel 10 so as to bear at their opposite ends against the shoulder 96 (Figs. 1 and 7) which is provided at the inner end of the shell 34 where it connects to the housing 20. Thus, a plurality of auxiliary springs 95 are arranged to extend between the piston 40 and the fixed end of the shell-housing structure to assist the main spring 24 in elastically resisting recoil movements of the gun barrel 10 and in providing counter recoil movements thereof.

It will be understood that the operative parts of the mechanism of the invention may be so relatively proportioned and arranged that upon assembly of the device the spring 64 will be slightly pre-loaded, whereby the spring 64 will be adapted to elongate during service of the device as may be required to compensate for leakage of fluid from the piston-cylinder unit. It will also be understood that the screws 32 at the inner end of the shell formation may provide convenient means for filling and refilling the fluid chamber portions of the mechanism, as required. By removing two or more of the screws 32 a supply of fluid may be readily introduced through the opening provided by removal of one of the screws while the air previously contained within the unit will be permitted to escape through the other openings thus provided. Although only a limited number of forms of the invention have been shown and described in detail it will be apparent to those skilled in the art that the invention is not so limited but that various changes may be made therein without departing from the spirit of the invention or the scope of the appended claims.

I claim:

1. An automatic gun including a supporting base and a barrel arranged to be longitudinally reciprocable relative to said base, a coil spring slidably mounted about said barrel and bearing at one of its ends against said base, abutment means extending from said barrel and bearing against said spring at the other of its ends whereby said spring elastically resists recoil movements of said barrel and provides counter-recoil movements thereof, a pair of spaced concentric sleeves carried by a fluid-sealed end wall portion of said base to extend concentrically about said coil spring, a third sleeve carried by said barrel to extend telescopically between said first mentioned sleeves, gland means slidably mounted between the innermost of said sleeves and said third sleeve to provide a movable fluid-sealed wall spaced from said base end wall portion to provide a fluid chamber therebetween, piston means carried by said third sleeve intermediately of said fluid chamber and arranged in fluid-sealing relation with respect to the outermost of said sleeves and said innermost sleeve to divide said fluid chamber into two portions of different cross sectional areas, said piston means having constricted fluid passageways therethrough communicating with opposite of said fluid chamber portions, valve means associated with said fluid passageways for regulating flow of fluid through said piston, and an elastically deformable member carried by said innermost sleeve and bearing against said gland means to position the latter longitudinally relative to said innermost sleeve and adapted to be biased in response to fluid pressures acting against said gland to permit said gland to move relative to said innermost sleeve to modify the longitudinal extent of said fluid chamber.

2. An automatic gun including a supporting base and a barrel arranged to be longitudinally reciprocable relative to said base, a pair of spaced concentric sleeves carried by a fluid-sealed end wall portion of said base to extend concentrically about said gun barrel, a third sleeve carried by said barrel to extend telescopically between said first mentioned sleeves, gland means slidably mounted between the innermost of said sleeves and said third sleeve to provide a movable fluid-sealed wall spaced from said base end wall portion to provide a fluid chamber therebetween, piston means carried by said third sleeve intermediately of said fluid chamber and arranged in fluid-sealing relation with respect to the outermost of said sleeves and said innermost sleeve to divide said fluid chamber into two portions of different cross sectional areas, said piston means having constricted fluid passageways therethrough communicating with opposite of said fluid chamber portions, valve means associated with said fluid passageways for regulating flow of fluid through said piston, and an elastically deformable member carried by said innermost sleeve and bearing against said gland means to position the latter longitudinally relative to said innermost sleeve and adapted to be biased in response to fluid pressures acting against said gland to permit said gland to move relative to said innermost sleeve to modify the longitudinal extent of said fluid chamber.

3. An automatic gun including a supporting base and a barrel arranged to be longitudinally reciprocable relative to said base, a coil spring slidably mounted about said barrel and bearing at one of its ends against said base, abutment means extending from said barrel and bearing against said spring at the other of its ends whereby said spring elastically resists recoil movements of said barrel and provides counter-recoil movements thereof, a pair of spaced concentric sleeves carried by a fluid-sealed end wall portion of said base to extend concentrically about said coil spring, a third sleeve carried by said barrel to extend telescopically between said first mentioned sleeves, gland means slidably mounted between the innermost of said sleeves and said third sleeve to provide a movable fluid-sealed wall spaced from said base end wall portion to provide a fluid chamber therebetween, piston means carried by said third sleeve intermediately of said fluid chamber and arranged in fluid-sealing relation with respect to the outermost of said sleeves and said innermost sleeve to divide said fluid chamber into two portions of different cross sectional areas, said piston means having constricted fluid passageways therethrough communicating with opposite of said fluid chamber portions, valve means carried by said piston in registry with only some of said fluid passageways and adapted to adjust the rate of flow of fluid through said piston to different regulated rates when flowing therethrough in opposite directions, and means for resiliently positioning said gland relative to the longitudinal extent of said innermost sleeve and adapted to be biased longitudinally thereof in response to changing fluid pressures thereon.

4. A rapid fire gun including a supporting base and a gun barrel reciprocable relative thereto, a coil spring mounted upon the said barrel and arranged to bear at one end against said base, an abutment carried by said barrel and adapted to bear against said spring at its opposite end, sleeve means carried by said base to provide an annular fluid chamber, a force member carried by said barrel to extend into said chamber and adapted to move axially relative to said chamber during recoil and counter-recoil movements of said barrel, gland means slidably mounted in said chamber to engage said force member to fluid seal the entrance thereof into said chamber, piston means carried by said force member interiorly of said fluid chamber and having fluid passageways therethrough, check valve means carried by said piston for controlling passage of fluid through said passageways in such manner as to more readily permit flow of fluid in one direction than in the opposite direction so as to provide substantial resistance to recoil movements of said gun barrel and less resistance to counter-recoil movements thereof.

5. A rapid fire gun including a supporting base and a gun barrel reciprocable relative thereto, a coil spring mounted upon the said barrel and arranged to bear at one end against said base, an abutment carried by said barrel and adapted to bear against said spring at its opposite end, sleeve means carried by said base to provide an annular fluid chamber, a force member carried by said barrel to extend into said chamber and adapted to move axially relative to said chamber during recoil and counter-recoil movements of said barrel, gland means slidably mounted in said chamber to engage said force member to fluid seal the entrance thereof into said chamber, piston means carried by said force member interiorly of said fluid chamber and having fluid passageways therethrough, check valve means carried by said piston for controlling passage of fluid through said passageways in such manner as to more readily permit flow of fluid in one direction than in the opposite direction so as to provide substantial resistance to recoil movements of said gun barrel and less resistance to counter-recoil movements thereof, and resilient means to back up said gland means and adapted to be biased in response to the action of fluid pressure forces against said gland means to permit the latter to move relative to said force member.

6. A rapid fire gun including a supporting base and a gun barrel reciprocable relative thereto, sleeve means carried by said base to provide an annular fluid chamber, a force member carried by said barrel to extend into said chamber and adapted to move axially relative to said chamber during recoil and counter-recoil movements of said barrel, gland means slidably mounted in said chamber to engage said force member to fluid seal the entrance thereof into said chamber, piston means carried by said force member interiorly of said fluid chamber and having fluid passageways therethrough, check valve means carried by said piston for controlling passage of fluid through said passageways in such manner as to more readily permit flow of fluid in one direction than in the opposite direction so as to provide substantial resistance to recoil movements of said gun barrel and less resistance to counter-recoil movements thereof, and resilient support means backing up said gland means and adapted to be biased in response to the action of fluid pressure forces against said gland means to permit the latter to move relative to said force member.

7. A rapid fire gun including a supporting base and a gun barrel reciprocable relative thereto, a coil spring mounted upon the said barrel and arranged to bear at one end against said base, an abutment carried by said barrel and adapted to bear against said spring at its opposite end, sleeve means carried by said base to provide an annular fluid chamber, a force member carried by said barrel to extend into said chamber and adapted to move axially relative to said case during recoil and counter-recoil movements of said barrel, gland means slidably mounted in said chamber to engage said force member to fluid seal the entrance thereof into said chamber, piston means carried by said force member interiorly of said fluid chamber and having a plurality of fluid passageways therethrough, a hollow spool mounted upon said piston in open communication with each of said fluid passageways, check valve devices slidably disposed within some of said spools, spring devices carried by said last mentioned spools to bear resiliently against said valve devices, said spool and check valve devices being arranged to provide substantial resistance to fluid flow through said passages in conjunction with recoil movements of said gun barrel and less resistance to fluid flow in conjunction with counter-recoil movements thereof, and coil springs disposed within said chamber and encircling at like end portions corresponding of said spool means and bearing at their other end portions against said base.

8. A rapid fire gun including a supporting base and a gun barrel reciprocable relative thereto, a coil spring mounted upon the said barrel and arranged to bear at one end against said base, an abutment carried by said barrel and adapted to bear against said spring at its opposite end, sleeve means carried by said base to provide an annular fluid chamber, a force member carried by said barrel to extend into said chamber and adapted to move axially relative to said chamber during recoil and counter-recoil movements of said barrel, gland means slidably mounted upon said sleeve to engage said force member to fluid seal the entrance thereof into said chamber, piston means carried by said force member, a valve plate movably mounted upon said piston and adapted to abut thereagainst to close some of said fluid passageways and to move therefrom so as to uncover said passageways, spring means carried by said piston and resiliently bearing against said valve plate so as to bias the latter toward the passageway covering position, said piston and valve plate devices being so arranged as to provide a check valve device adapted to impose substantial resistance against fluid flow through said piston in conjunction with recoil movements of said gun barrel and lesser resistance to fluid flow therethrough in conjunction with counter-recoil movements thereof.

9. A rapid fire gun including a supporting base and a gun barrel reciprocable relative thereto, sleeve means carried by said base to provide an annular fluid chamber, a force member carried by said barrel to extend into said case and adapted to move axially relative to said chamber during recoil and counter-recoil movements of said barrel, gland means slidably mounted in said chamber to engage said force member to fluid seal the entrance thereof into said chamber, piston means carried by said force member interiorly of said fluid chamber and having a plurality of fluid passageways therethrough, a hollow spool mounted upon said piston in open communication with each of said fluid passageways, check valve devices slidably disposed within some of said spools, spring devices carried by said last-mentioned spools to bear resiliently against said valve devices, said spool and check valve devices being arranged to provide substantial resistance to fluid flow through said passages in conjunction with recoil movements of said gun barrel and less resistance to fluid flow in conjunction with counter-recoil movements thereof, and coil springs disposed within said chamber and encircling at like end portions corresponding of said spool means and bearing at their other end portions against said base.

10. A rapid fire gun including a supporting base and a gun barrel reciprocable relative thereto, sleeve means carried by said base to provide an annular fluid chamber, a force member carried by said barrel to extend into said chamber and adapted to move axially relative to said chamber during recoil and counter-recoil movements of said barrel, gland means slidably mounted in said chamber to engage said force member to fluid seal the entrance thereof into said chamber, piston means carried by said force member, a valve plate movably mounted upon said piston and adapted to abut thereagainst to close some of said fluid passageways and to move therefrom so as to uncover said passageways, spring means carried by said piston and resiliently bearing against said valve plate so as to bias the latter toward the passageway covering position, said piston and valve plate devices being so arranged as to provide a check valve device adapted to impose substantial resistance against fluid flow through said piston in conjunction with recoil movements of said gun barrel and lesser resistance to fluid flow therethrough in conjunction with counter-recoil movements thereof.

JOHN C. TROTTER.

CERTIFICATE OF CORRECTION.

Patent No. 2,339,227.  January 11, 1944.

JOHN C. TROTTER.

It is hereby certified that error appears in the printed specification of the above numbered patent requiring correction as follows: Page 4, second column, line 46, claim 9, for "case" read --chamber--; and that the said Letters Patent should be read with this correction therein that the same may conform to the record of the case in the Patent Office.

Signed and sealed this 14th day of March, A. D. 1944.

Leslie Frazer (Seal)   Acting Commissioner of Patents.